United States Patent
Kim et al.

(10) Patent No.: US 10,062,291 B1
(45) Date of Patent: Aug. 28, 2018

(54) SYSTEMS AND METHODS FOR PROVIDING IMPROVED FLIGHT GUIDANCE

(71) Applicant: The Boeing Company, Chicago, IL (US)

(72) Inventors: Geun I. Kim, Bellevue, WA (US); Roy S. Alcantara, Seattle, WA (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 14/519,661

(22) Filed: Oct. 21, 2014

(51) Int. Cl.
*G08G 5/00* (2006.01)
*G07C 5/08* (2006.01)
*B64C 13/18* (2006.01)

(52) U.S. Cl.
CPC ........... *G08G 5/0034* (2013.01); *B64C 13/18* (2013.01); *G07C 5/0841* (2013.01); *G08G 5/0021* (2013.01); *G08G 5/0047* (2013.01)

(58) Field of Classification Search
CPC .. G08G 5/0034; G08G 5/0047; G08G 5/0021; G07C 5/0841; B64C 13/18
See application file for complete search history.

(56) References Cited

U.S. PATENT DOCUMENTS

| | | | | |
|---|---|---|---|---|
| 4,326,253 A * | 4/1982 | Cooper | ................ | G05D 1/0607 244/181 |
| 5,457,634 A * | 10/1995 | Chakravarty | ........ | G05D 1/0005 340/994 |
| 7,640,145 B2 * | 12/2009 | Wegerich | ........... | G05B 23/0254 703/2 |
| 7,930,075 B2 | 4/2011 | Alcantara et al. | | |
| 9,132,913 B1 * | 9/2015 | Shapiro | ................... | B64C 19/00 |
| 2008/0027594 A1 * | 1/2008 | Jump | ..................... | G05D 1/101 701/11 |
| 2011/0288836 A1 * | 11/2011 | Lacaille | ............. | G05B 23/0254 703/2 |
| 2012/0265374 A1 | 10/2012 | Yochum | | |
| 2012/0277936 A1 * | 11/2012 | Kumar Mn | .......... | G05D 1/0676 701/16 |

(Continued)

OTHER PUBLICATIONS

Richard A. Coppenbarger; "Climb Trajectory Prediction Enhancement Using Airline Flight-Planning Information"; American Institute of Aeronautics and Astronautics; AIAA-99/4147; 1999; p. 1-11.

(Continued)

*Primary Examiner* — Alan D Hutchinson
(74) *Attorney, Agent, or Firm* — Miller, Matthias & Hull LLP

(57) ABSTRACT

Systems and methods providing improved flight guidance are described. In some implementations, performance data from a plurality of completed flight segments of an aircraft are recorded and used to generate and/or update a regression model between one or more input parameters and one or more output parameters. Flight profile data for a current flight segment of the aircraft is estimated using the regression model and compared to flight profile data predicted based on pre-programmed performance data. The estimated and predicted flight profile data are compared to determine if a difference between the two exceeds a predetermined amount and flight guidance for a current flight segment is generated based on the estimated flight profile data if the difference exceeds the predetermined amount.

22 Claims, 8 Drawing Sheets

(56) References Cited

U.S. PATENT DOCUMENTS

2013/0218823 A1* 8/2013 Ferrand .................. G06N 5/025
706/46
2014/0249700 A1* 9/2014 Elias ...................... B64D 31/00
701/14

OTHER PUBLICATIONS

William Chan; Ralph Bach; and Joseph Walton; "Improving and Validating CTAS Performance Models"; AIAA Gudance, Navigation, and Control Conference and Exhibit, Aug. 14-17, 2000, Denver, CO; AIAA-2000-4476; American Institute of Aeronautics and Astronautics; p. 1-9.
Charles A. Schultz; David Thipphavong; and Heinz Erzberger; "Adaptive Trajectory Prediction Algorithm for Climbing Flights"; American Institute of Aeronautics and Astronautics; AIAA-2012-4931; 2012; p. 1-16.
David Thipphavong; "Reducing Aircraft Climb Trajectory Prediction Errors with Top-of-Climb Data"; Guidance, Navigation, and Control and Co-located Conferences; Aug. 19-22, 2013; Boston, MA; American Institute of Aeronautics and Astronautics; AIAA-2013-5129; 2013; p. 1-12.
Young Park; and David P. Thippahavong; "Performance of an Adaptive Trajectory Prediction Algorithm for Climbing Aircraft"; AIAA Aviation; Aug. 12-14, 2013; Los Angeles, CA; American Institute of Aeronautics and Astronautics; AIAA-2013-4263; 2013; p. 1-14.
David P. Thipphavong; Charles A. Schultz; Alan G. Lee; and Steven H. Chan; "Adaptive Algorithm to Improve Trajectory Prediction Accuracy of Climbing Aircraft"; Journal of Guidance, Control, and Dynamics vol. 36, No. 1, Jan.-Feb. 2013; p. 15-24.
Geun Kim; "Adaptive Control Methods for Climb Trajectory Prediction"; Final project presented at University of Washington; Dec. 13, 2013; p. 1-6.
"Augmented Reality Aircraft Management System"; Unpublished U.S. Appl. No. 13/898,686, filed May 21, 2013.

* cited by examiner

SYSTEMS AND METHODS FOR PROVIDING IMPROVED FLIGHT GUIDANCE

FIELD

The present disclosure relates generally to aircraft flight guidance and control systems and more specifically to systems and methods for providing improved flight guidance information to flight crew, flight control systems of the aircraft, and/or ground systems in communication with the aircraft.

BACKGROUND

Modern aircraft typically include computer-based guidance and control systems which may ease the workload of the flight crew in operating the aircraft. Aircraft guidance and control systems generally provide flight guidance and navigation information to the flight crew of the aircraft and may generate control commands for automatically driving control surfaces of the aircraft. For example, a typical commercial aircraft includes a Flight Management System (FMS) which is an onboard computer automation system that assists the flight crew in a variety of in-flight tasks such as navigation, performance calculations, reference trajectory computation, and guidance. In this regard, the flight management computer (FMC) of the FMS is configured to execute certain navigation, guidance, flight planning, and performance functions for the aircraft. In addition, modern commercial aircraft with fly-by-wire control systems typically include a flight controls computer for generating control commands which can be used by an autopilot and/or autothrottle systems to automatically control movement of control surfaces or application of thrust so as to fly the aircraft in accordance with data generated by the FMS.

Performance functions of the flight management computer of conventional aircraft typically rely on performance data which is pre-programmed into the FMC prior to the aircraft's entry into service. Such performance data (also known as model/engine database(s)) is generated based on predictive analysis and flight test validation during the design/build and validation stages of the aircraft prior to entry into service. As such, the pre-programmed performance data may become outdated and/or less accurate as the aircraft enters into and continues operation in service. Updates to the analysis-based performance data is typically costly and may not be practical in some cases.

As noted above, guidance and control systems of modern aircraft provide flight guidance and navigation information, which may facilitate flight planning activities. A typical flight plan documents the flight route of the aircraft for a given flight. For example, the flight plan documents the departure and arrival points, estimated time en-route, and identifies a number of waypoints in between the departure and arrival points. The flight plan typically includes information regarding the waypoints such as speed and altitude at each waypoint as well as certain predicted aircraft performance throughout the flight route. The flight route typically consists of several flight segments, including take-off, climb, cruise, descent, and landing segments. Each flight segment may have a flight trajectory or flight path associated therewith. For example, a climb trajectory may be defined for the climb segment, which may be expressed in terms of the rate of climb as a function of time. An aircraft's rate of climb and corresponding climb trajectory may be a type of flight guidance information that may be provided to the flight crew and/or other aircraft systems prior to and/or updated during flight. Similarly, a descent trajectory may be defined, which can be expressed in terms of the rate of descent as a function of time. Again, descent speeds may be flight guidance information that may be provided to the flight crew and/or flight control computer for generating commands to maintain the desired speed during descent to achieve the planned descent trajectory. In some cases, climb and descent segments may consist of multiple sub-segments, one or more of which may be identifiable by different performance of the aircraft during the particular sub-segment.

As air traffic continues to grow, accurate predictions of flight trajectories continue to be an important aspect of flight planning. As such, techniques for improving predictions of flight trajectories may be needed. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

According to some embodiments of the present disclosure, a computer-implemented method for providing flight guidance is described. In some implementations, the method includes recording performance data from a plurality of completed flight segments of an aircraft. The method further includes updating a regression model based on the recorded performance data. The method also includes estimating flight profile data for a current flight segment of the aircraft using the updated regression model and comparing the estimated flight profile data with predicted flight profile data for the current flight segment, the predicted flight profile data for the current flight segment being based on pre-programmed performance data stored onboard the aircraft prior to the plurality of completed flight segments. The method further includes generating flight guidance information for the current flight segment based on the estimated flight profile data if the estimated flight profile data deviates from the predicted flight profile data by a predetermined amount.

According to other embodiments of the present disclosure, a guidance and control system for an aircraft is described. In some implementations, the guidance and control system may include a flight guidance system which is operative to generate flight guidance information. The flight guidance system includes a processor programmed to cause performance data from a plurality of completed flight segments of the aircraft to be recorded and to update a regression model based on the recorded performance data from the plurality of completed flight segments. The processor may be further programmed to estimate flight profile data for a current flight segment using the updated regression model, to compare the estimated flight profile data to predicted flight profile data for the current flight segment, where the predicted flight profile data for the current flight segment based on pre-programmed performance data stored onboard the aircraft prior to the plurality of completed flight segments, and to generate flight guidance information based on the estimated flight profile data if a deviation between the estimated flight profile data and the predicted flight profile data exceeds a predetermined amount.

In further embodiments, a computer readable medium for performing processes according to the present disclosure is described. In some implementations, the computer readable medium includes instructions, which when executed on a processor perform a method including the steps of: causing performance data from a plurality of completed flight segments of an aircraft to be recorded and updating a regression model based on the recorded performance data. The computer readable medium includes further instructions for estimating flight profile data for a current flight segment of the aircraft using the regression model, comparing the estimated flight profile data with predicted flight profile data for the current flight segment, where the predicted flight profile data for the current flight segment based on performance data stored on the aircraft prior to the plurality of completed flight segments. The computer readable medium includes further instructions for generating flight guidance information for the current flight segment based on the estimated flight profile data if the estimated flight profile data deviates from the predicted flight profile data by a predetermined amount.

The features, functions, and/or one or more advantages described herein can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

The plurality of figures presented in this application illustrates variations and different aspects of the embodiments of the present disclosure. Accordingly, the detailed description on each illustration will describe the differences identified in the corresponding illustration. The figures presented in this application and described in further detail below are provided for illustration purposes only and are not intended to limit the scope of the present disclosure.

DETAILED DESCRIPTION

Figure 1:
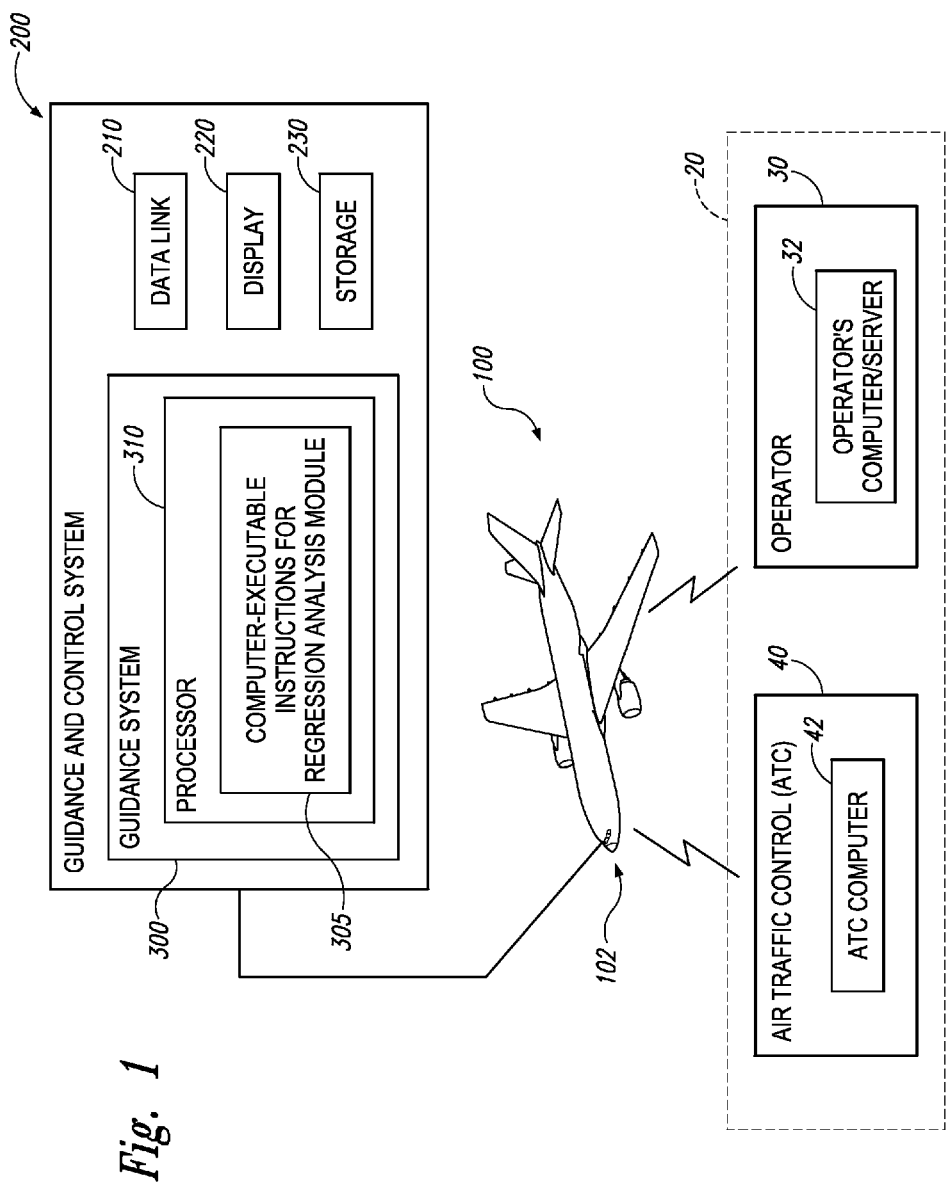
FIG. 1 shows an illustration of an environment in which an aircraft including a guidance and control system may operate according to some examples of the present disclosure.

The following detailed description is directed to systems and methods for providing improved flight guidance information. Although the disclosed examples are described in the context of a tube-and-wing aircraft (e.g., aircraft 100 as shown in FIG. 1), the examples herein may be implemented in other aircraft configurations, for example and without limitation, a blended wing aircraft configuration, a hybrid wing-body aircraft configuration, and other aircraft configurations. This disclosure is not limited to any particular type of aircraft. Rather, the technologies described herein may be advantageous for any aircraft. References are made to the accompanying drawings that form a part hereof, and in which are shown, by way of illustration, specific embodiments or examples. Like numerals represent like elements through the several figures.

Figure 2:
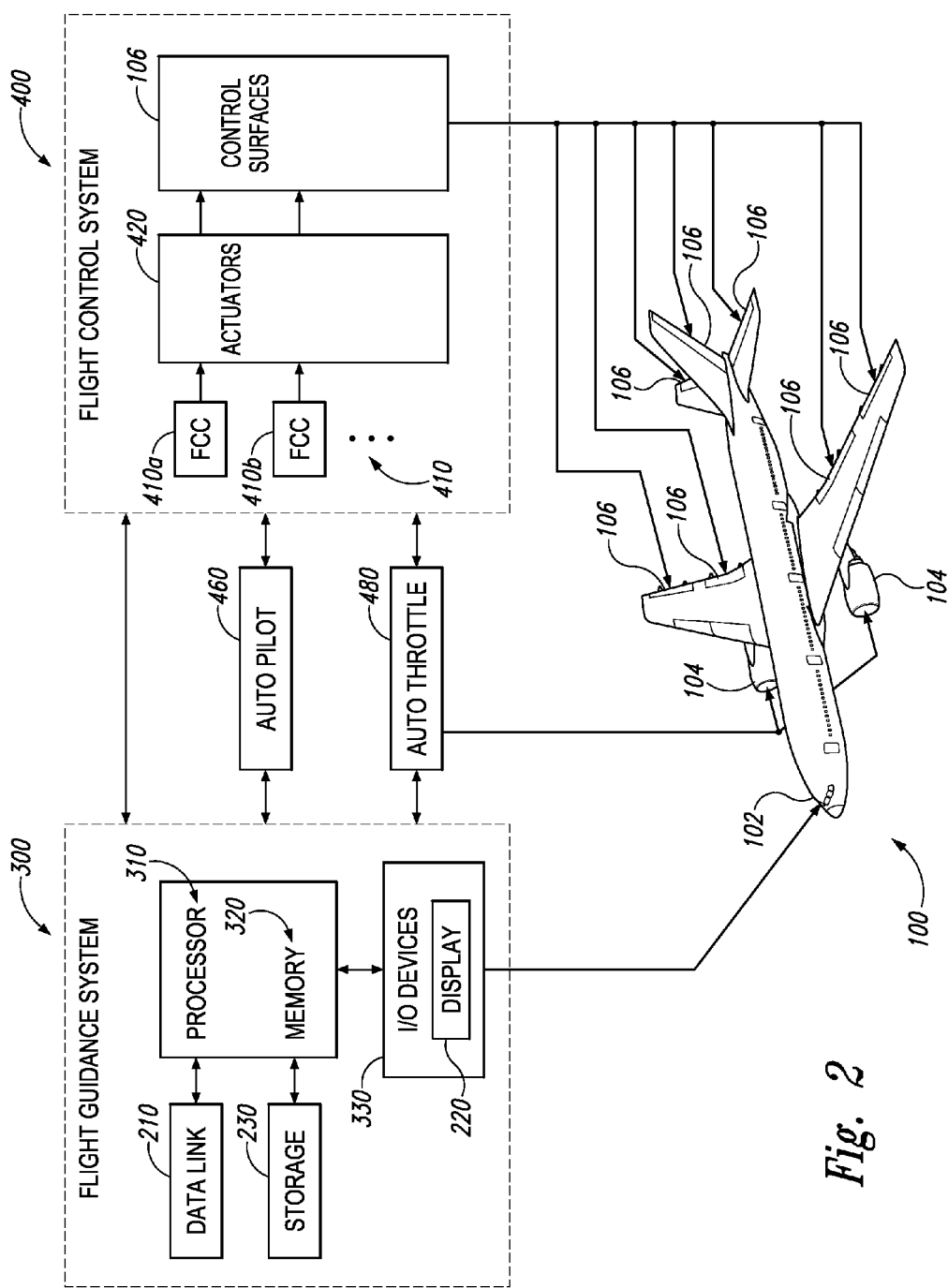
FIG. 2 shows an illustration of an aircraft including a guidance and control system according to the examples of the present disclosure.
Figure 3:
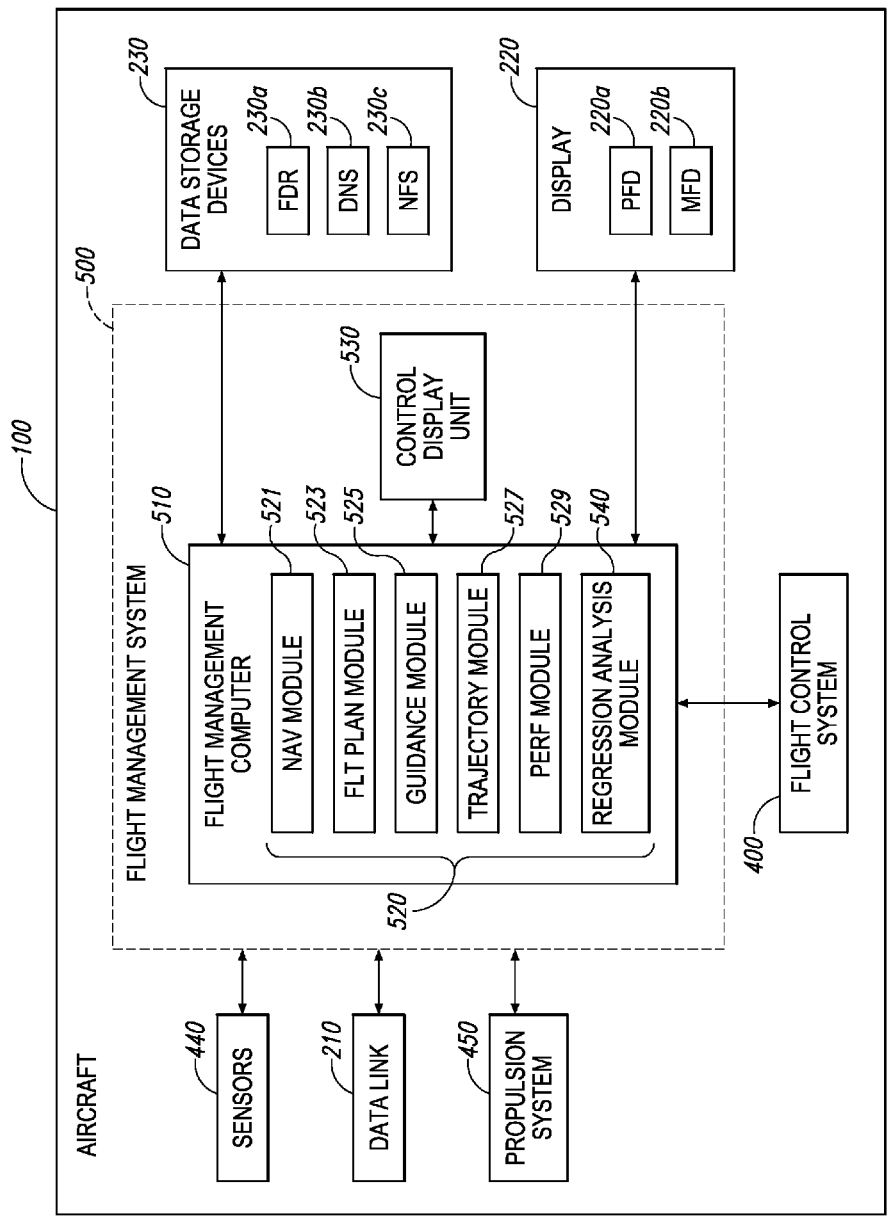
FIG. 3 shows a block diagram of a flight guidance and control system according to the present disclosure.
Figure 4:
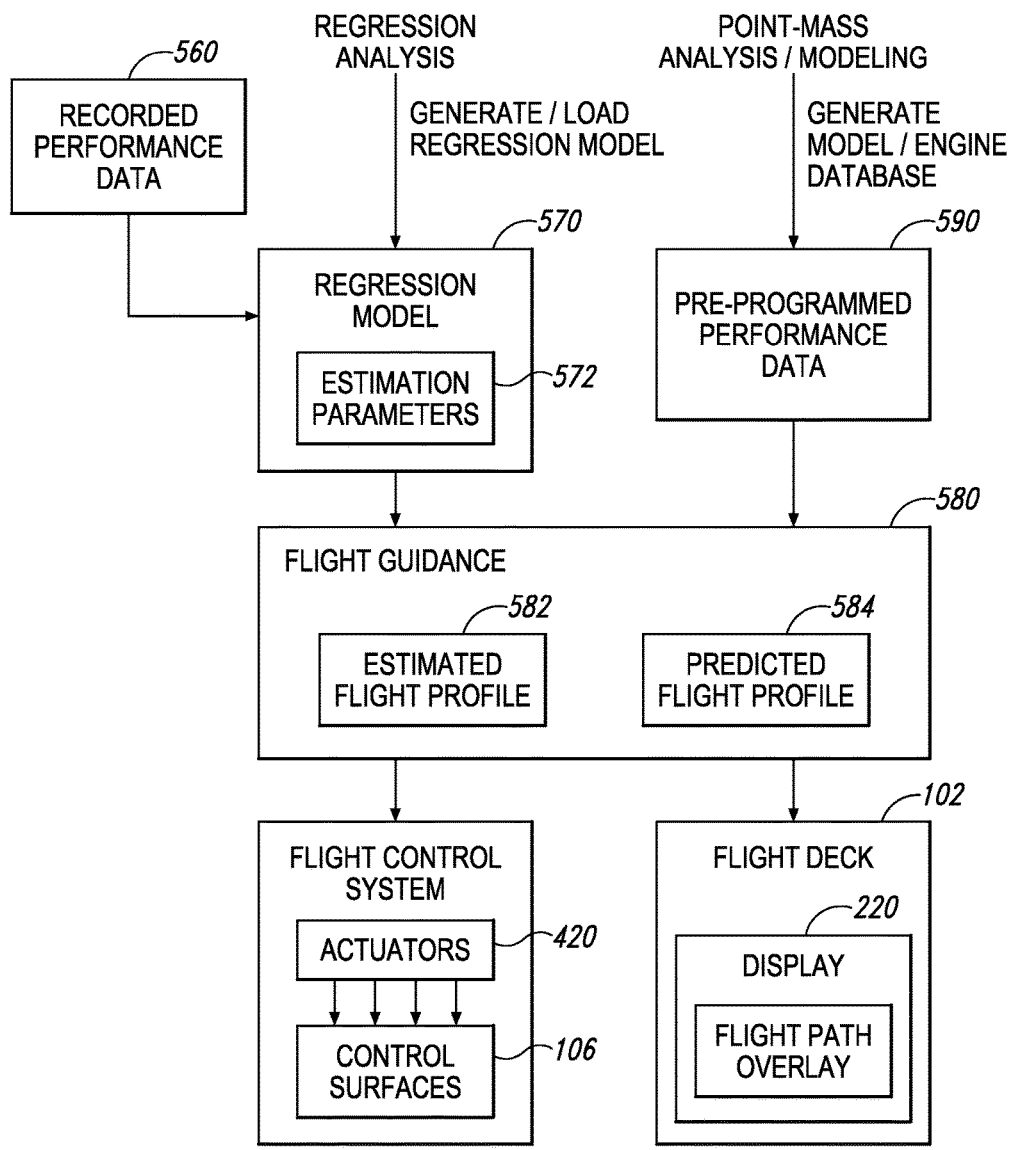
FIG. 4 shows a block diagram of a flight guidance system including a regression model according to the examples herein.

Turning now to the drawings, FIG. 1 illustrates an environment in which an aircraft 100 that includes a guidance and control system 200 according to some examples of the present disclosure may operate. FIGS. 2-4 show block diagrams of various components of guidance and control systems which may be implemented in an aircraft (e.g., aircraft 100) according to the present disclosure.

In the environment in FIG. 1, the aircraft 100 may be configured to communicate wirelessly with various ground systems 20, for example ground computer system(s) 32 of the operator 30 of the aircraft (e.g., the airline) and/or computer systems 42 of Air Traffic Control (ATC) 40. For example, the aircraft 100 may be equipped with a datalink system 210. In some examples, the datalink system 210 may be implemented according to ARINC standards (e.g., ARINC 633), and may, for example, be incorporated in an Aircraft Communications Addressing and Reporting System (ACARS) of the aircraft. In other examples, the datalink system 210 may be implemented via alternative wireless communication technologies that allow wireless communication between the aircraft and ground systems. The operator's computer system may include one or more servers which may receive data from, store, and/or transmit data to the aircraft 100. The ATC's computer systems 42 may also receive data from, store, and/or transmit data to the aircraft 100. While not specifically shown, the aircraft 100 may also be configured to communicate with other third party computer systems (e.g., weather and/or map services for receiving weather information and/or navigation support).

As previously mentioned, the aircraft 100 may include a guidance and control system 200, which includes a flight guidance system 300 having a processor 310 programmed to perform functions of the flight guidance system as will be further described below. In this regard, the processor 310 may include computer executable instructions 305 for performing functions of the Regression Analysis module 540 (see e.g., FIGS. 3 and 4) described in further detail below.

In some examples, the flight guidance system 300 may be communicatively coupled to a display device 220 located in a flight deck 102 of the aircraft 100. The display device 220 may be a primary flight display 220a, a multi functional display 220b, or a control display unit 530, which may be associated with a conventional flight management system, e.g., as shown in FIG. 3. In further examples, the flight guidance system 300 may be communicatively coupled to a data storage device 230 for storing data (e.g., recorded performance data, and/or pre-programmed performance) as will be further described.

As further shown in FIG. 2, a guidance and control system 200 according to the present disclosure may include a flight guidance system 300 and a flight control system 400. As described herein, the flight guidance system 300 is configured to assist flight crew with a variety of in-flight tasks such as navigation, performance calculations, trajectory computation, and guidance. The flight guidance system 300 includes a processor 310 and memory 320, which may be non-volatile memory or any other persistent storage device for storing performance data recorded during a flight. Other data associated with functions of the flight guidance system may be stored in memory 320, for example pre-programmed data, including a Model/Engine data base (MEDB), which is interchangeably referred to herein as performance database, as well as other data such as a navigational database (NavDB). While the navigational database may be updated periodically, e.g., monthly, the performance database is typically not updated unless there is a specific event, for example an engine change, that may require loading of additional model/engine data into the flight management computer.

In further example, the flight guidance system 300 may be operatively coupled to additional data storage devices 230 on the aircraft, for example a flight data recorder (FDR) 230a, onboard network system (ONS) 230b, or network file server (NFS) 230c (see FIG. 3). Data recorded and/or generated in performance of the functions herein may be stored in any of the data storage devices 230. The flight guidance system 300 is further operatively coupled to a number of Input/Output devices 330, such as keyboard(s) and/or keypads, touchscreen(s), switches, and display(s) 220, some of which may be located in the flight deck 102 of the aircraft.

The flight control system 400 is configured to generate control commands for driving flight control surfaces 106 of the aircraft. The control commands may be transmitted to actuators 420 which may position the flight control surfaces (e.g., ailerons, flaps, slats, rudder, elevator, etc) in accordance with the control commands. The flight control system 400 may include one or more flight control computer(s) (FCCs) 410 (e.g., primary flight control computer(s) 410a, secondary flight control computer(s) 410b) which may be communicatively coupled to the flight guidance system 300. The flight guidance and flight control systems 300, 400 may be communicatively coupled to an autopilot system 460 and/or an auto-throttle system 480 for automatically driving certain functions of the aircraft. For example, the autopilot system 460 may generate commands for automatically driving one or more flight control surfaces 106 of the aircraft without flight crew input. The auto-throttle system 480 may generate commands for controlling the engine(s) 104 of the aircraft.

FIG. 3 shows a guidance and control system implemented in an aircraft 100 according to further examples of the present disclosure. Components of the flight guidance system 300 (see FIG. 2) may be incorporated within an existing Flight Management System (FMS) 500 of the aircraft. Typically, the FMS 500 includes a flight management computer (FMC) 510 which may be programmed to perform functions of the processor 310 of flight guidance system 200. Accordingly, computer executable instructions 305 for performing the functions associated with the Regression Analysis module 540 may be included in the FMC 510, or may be implemented in a different processor on-board the aircraft. As shown in FIG. 3, the FMC 510 may include a plurality of modules 520, such as a Navigation module 521 (e.g., for computing the aircraft's current state), a Flight Planning module 523 (e.g., for defining route and constraints), a Guidance module 525 (e.g., for providing lateral and vertical guidance/commands), a Trajectory module 527 (e.g., for defining intended flight path), and a Performance module 529 (e.g., for calculating performance parameters). The FMC 510 may receive information from sensors 440, the aircraft datalink system 210, and/or propulsion system 450.

In addition and as mentioned previously, the FMC 510 may include a Regression Analysis module 540 which may be programmed with a regression model 570 (FIG. 4). The FMC may be configured to execute functions associated with providing flight guidance and information based, at least in part, on the regression model alternatively to or in addition to performing flight guidance and planning functions based on the conventional performance module and pre-programmed performance database.

As described herein, the flight guidance system may be communicatively coupled to one or more display units. A typical FMS includes a control display unit 530, which may be used for displaying flight guidance information according to the present disclosure. In some examples, the flight guidance system may in addition to or alternatively be coupled to other aircraft display devices 220, such as a primary flight display 220a and/or a multi-functional display 220b located in the flight deck 102. As previously described, the FMC 510 may be communicatively coupled to additional data storage devices 230 on the aircraft, such as a flight data recorder (FDR) 230a, an onboard network system (ONS) 230b, one or more network file servers (NFS) 230c, and others.

With reference now to FIG. 4, components and functionality of the flight guidance system 300 will be described in further detail. As previously noted, flight guidance system 300 includes a processor 310 which includes computer executable instructions for performing functions of a Regression Analysis module 540. The Regression Analysis module 540 is configured to generate and/or update a regression model 570 based on actual performance data as recorded from flight segments flown by the aircraft (e.g., recorded performance data 560).

The regression model 570 may be generated onboard the aircraft or uploaded prior to flight. The regression model 570 may comprise a relationship between a number of performance parameters of the aircraft which is developed from performance data recorded from a number of flight segments completed by the aircraft. The regression model 570 may comprise a linear regression relationship between two variables, an input variable and an output variable. For example, a deterministic autoregressive moving average (DARMA) model or any other regression relationship which is linear in estimation parameters may be used. In further examples, regression relationships which are non-linear in estimation parameters may be used. The estimation parameters 572 may be determined using e.g., recursive least squares to fit the data to a function which minimizes the error term. As will be appreciated, the regression model 570 may be developed according to virtually any known regression modeling technique and is not limited to the specific examples described. Typically, as the number of completed flight segments upon which the regression model is based and/or updated increases, the statistical significance of the regression model (e.g., the relationship between the input and output variable(s)) increases. In further examples, the regression model 570 may be developed as a plurality of input parameters and one or more output parameters; as such, the present disclosure is not limited to single input/single output models.

Periodically, the Regression Analysis module 540 may update the regression model with additional recorded performance data. The Regression Analysis module 540 receives recorded performance data and uses the recorded performance data to update the fidelity of the regression model, for example, by updating the estimation parameters 572 of the regression model. As will be appreciated, the Regression Analysis module may include computer executable instructions for performing time series analysis and forecasting according to other known regression analysis techniques and is not limited to the specific examples described.

As further illustrated in FIG. 4, the flight guidance system 300 may include conventional components such as a performance database (e.g., MEDB) which is typically based on analysis point-mass models of the aircraft developed during the aircraft design/build process. Flight profile data is generated by the flight guidance system 300 using both the regression model 570 and pre-programmed performance data 590 from the performance database. Generating flight profile data may include determining a value for one or more parameters related to vertical and/or lateral flight profiles for the aircraft (e.g., determining a rate of climb, calibrated air speed (CAS) or MACH for a current and/or subsequent flight segment). Flight profile data associated with the regression model (e.g., data based on the regression model) is referred to herein as estimated flight profile data 582; flight profile data associated with pre-programmed performance data 590 (e.g., data based on the performance database) is referred to herein as predicted flight profile data 584. Flight guidance 580 may be generated in accordance with the appropriate flight profile data, e.g., as determined based on comparison between the estimated and predicted flight profile data. Flight guidance 580 may include lateral and vertical guidance as may be needed to control the aircraft. Flight profile data and/or certain flight guidance information may be communicated to a display 220 in the flight deck 102. For example, a flight profile based on the regression model may be displayed separately or as an overlay over a flight profile based on data obtained from the performance database.

Figure 5:
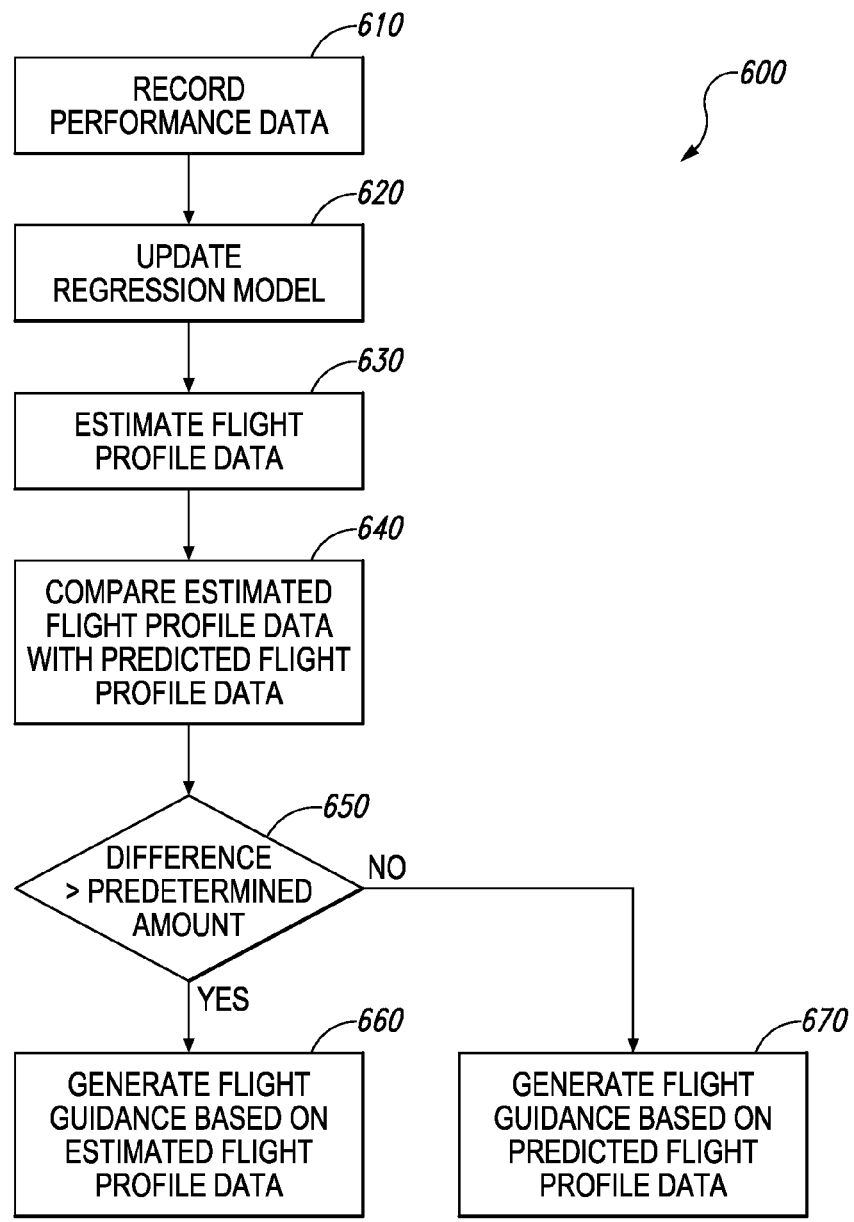
FIG. 5 shows a flow diagram of a method for providing flight guidance according to at least one embodiment described herein.

Computer-implemented methods for providing flight guidance according to embodiments of the present disclosure are described in further detail with reference to FIGS. 5-6. FIG. 5 shows a flow chart of a method 600 for providing flight guidance according to at least some of the examples herein. The method 600 may be performed by one or more systems onboard aircraft 100, for example the method may be performed, at least in part, by the flight guidance and control system 200 described herein. Unless otherwise indicated, more or fewer operations may be performed than shown in the figures and described herein. Additionally, unless otherwise indicated, these operations may also be performed in a different order than those described herein.

As shown starting in block 610, the method 600 includes recording performance data 560. The performance data 560 is associated with a given aircraft (e.g., aircraft 100). The performance data 560 may be performance data from a plurality of completed flight segments (e.g., from a number of prior flights flown by that same aircraft). The plurality of completed flight segments may be of the same type (e.g., climb segments, descent segments, cruise segments, etc.) The recorded performance data 560 may include aircraft state data (e.g., latitude, longitude, altitude, speed, rate of climb, track angle, heading angle), environmental data, and/or any other number of sensed or computed parameters (e.g., fuel flow, thrust, drag, gross weight, etc.). The recorded performance data 560 may include metadata (e.g., a time/date stamp) associated with individual data points or data sets of the recorded performance data. According to some examples, in which environmental data is recorded, such environmental data may be stored onboard the aircraft and the stored environmental data may be associated with respective performance data from the plurality of completed flight segments and/or metadata (e.g., date, time, etc.). The stored environmental data may include, for example but without limitation, recorded temperature, pressure, vertical and horizontal winds (e.g., headwinds, tailwinds, wind gusts, etc.), and atmospheric moisture. Estimated flight profile data thus may be further based, in part, on stored environmental data.

As shown in block 620, the method continues by updating a regression model 570 based on the recorded performance data 560. As previously described, the regression model 570 may comprise a linear regression relationship between one or more input parameters and one or more output parameters. The linear regression relationship may be defined by estimation parameters derived during generation of the regression model. Updating the regression model may include refining the estimation parameters 572 of the regression model using additional data (e.g., newly recorded performance from recently completed flight segments since a previous update of the regression model). By continuously updating the regression model 570 with recorded data from flights of the same aircraft, the fidelity of the regression model may be increased over time, and as such the accuracy of the expected performance of the aircraft as estimated by the regression model may be improved. The regression model may be updated periodically, for example, prior to or upon completion of a flight or upon completion of an individual flight segment.

As shown in block 630, the method further continues by estimating flight profile data for a current flight segment of the aircraft using the updated regression model. The current flight segment, in the context of the present disclosure, may include the flight segment that the aircraft is currently flying or an immediately upcoming flight segment for the aircraft. Estimating flight profile data may include determining a value of a first parameter (e.g., an output parameter) based on the value of a second parameter (e.g., an input parameter) or a plurality of input parameters. For example, estimating flight profile data may include estimating a value of a first output parameter (e.g., a rate of climb) based on a linear regression relationship between the output parameter and one or more input parameters (e.g., fuel flow to engines, gross weight, etc.), and the estimated output parameter may then be used to generate an estimated flight trajectory for the current segment, e.g., to estimate a lateral or vertical flight trajectory based at least in part on the estimated value of the first output parameter (e.g., estimating a climb trajectory as a function of the estimated rate of climb). The examples of specific input and output parameters are provided for illustration only and do not limit the scope of the disclosure. As would be appreciated, virtually any other combination of parameters and/or relationships between such parameters may be used to develop a regression model according to the present disclosure.

The estimated flight profile data 582 may then be compared with predicted flight profile data 584, as shown in block 640. The predicted flight profile data 584 is based on pre-programmed performance data 590 stored onboard the aircraft prior to the completion of the plurality of flight segments. For example, the predicted flight profile data may be computed from performance data in the performance database of the FMS. As such, the predicted flight profile data may not reflect changes to the aircraft (e.g., due to environmental effects or maintenance activities occurring during and/or as a result of the prior flights) or discrepancies between the expected performance and actual performance of the aircraft. The pre-programmed performance data 590 is typically loaded into the FMS before the aircraft enters into service and updates to the pre-programmed performance data, which can be costly or impractical, may not be performed regularly or at all. In contrast, the estimated flight profile data 582, which is based on the regression model 570, may more accurately capture changes to the performance of the aircraft over time, e.g., by virtue of recurring updates to the regression model with newly recorded data from completed flights of that same aircraft.

In a similar manner as with the estimated flight profile data, the predicted flight profile data may include values for certain parameters computed based on information stored in the performance database. For example, a predicted rate of climb may be the rate of climb expected during a given flight segment based on the performance information in the performance database, and a predicted flight trajectory may then be generated based on the predicted value of the rate of climb.

The method continues by generating flight guidance 580, as further shown in block 650. Generating flight guidance may include generating lateral and/or vertical guidance commands. The lateral and/or vertical guidance commands may be transmitted to an autopilot and/or the flight control system for driving control surfaces in accordance with the guidance commands. In addition, flight guidance information may be generated, which may include information for visualizing the flight profile data and/or guidance commands, for example by displaying the information on a display 220 in the flight deck 102 of the aircraft. For example, a vertical flight profile (e.g., a climb trajectory) may be visually represented as a plot of the rate of climb as a function of time, which can be displayed in the flight deck.

If a difference between the estimated flight profile data and the predicted flight profile data exceeds a predetermined amount, flight guidance for the current flight segment is generated based on the flight profile data associated with the regression model (e.g., based on the estimated flight profile data), as shown in block 660. In some instances, the difference between estimated and predicted flight profile data may be trivial (e.g., below a threshold amount) in which cases, flight guidance may be provided based on the pre-programmed data (as shown in block 670) or based on the regression model. In some examples, flight guidance based on both estimated and predicted flight profile data may be generated and displayed in the flight deck, independently (e.g., on separate display screens) or overlaid on a same display screen. In further examples, the flight crew may take an action with respect to flight profile data and/or flight guidance information displayed in the flight deck. For example, the flight crew may elect to update the flight plan in accordance with the estimated flight trajectory which is based on regression model, or the flight crew may elect to maintain a flight plan based on data from the pre-programmed performance database. In such cases, the flight crew or a member of the crew may cause a signal to be generated, e.g., by submitting an input via an I/O device 330 in the flight deck. The input may correspond to a selection of the estimated flight trajectory or the predicted flight trajectory. The flight guidance system 300 receives the signal and performs further flight management functions in accordance therewith.

Figure 6A:
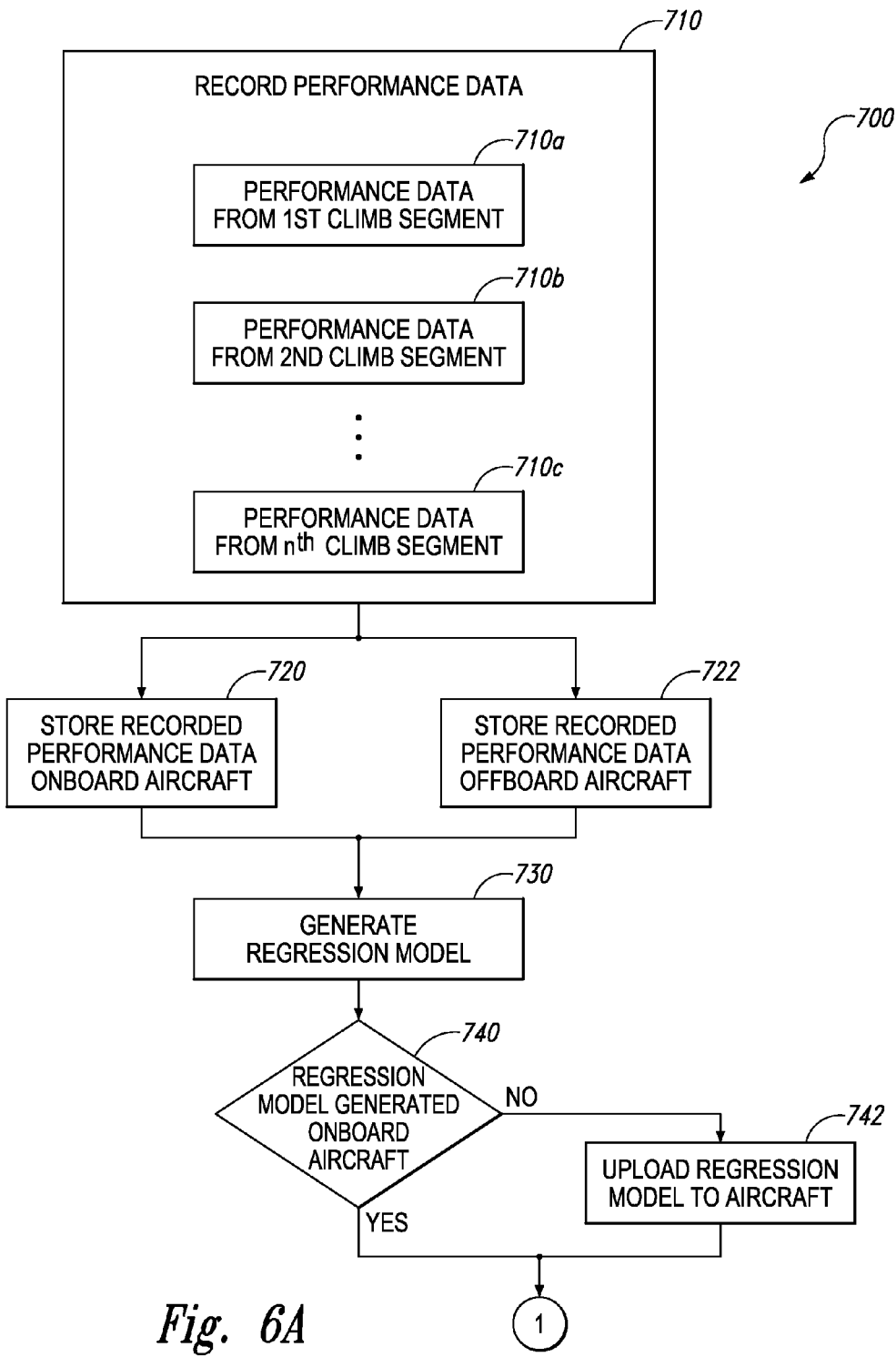
FIGS. 6A-6B show flow diagrams of methods for providing flight guidance according to the examples herein.
Figure 6B:
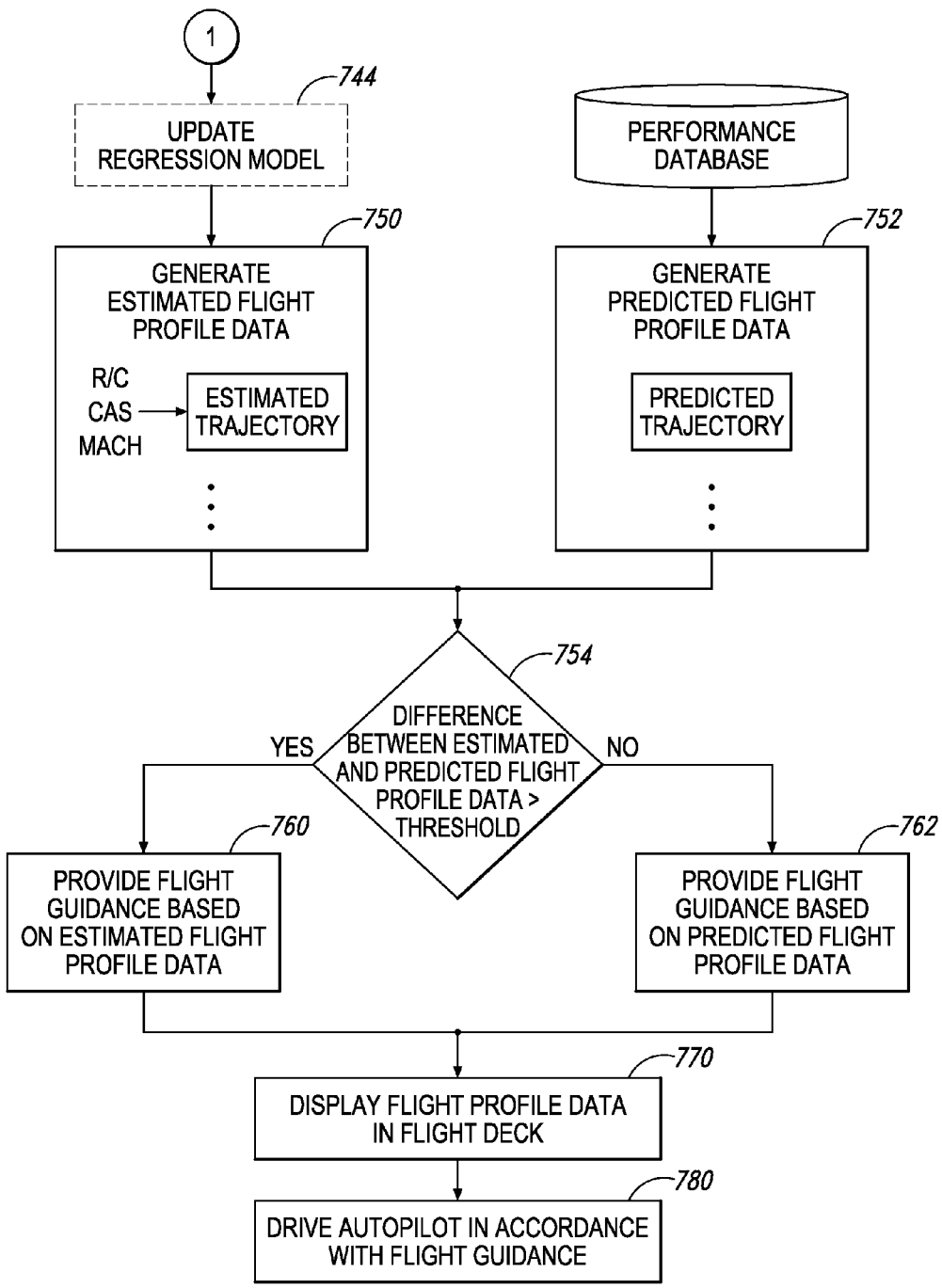

FIGS. 6A and 6B show a flow chart of further examples of methods according to the present disclosure. According to the exemplary method 700 illustrated in FIGS. 6A-6B, and as shown in block 710, performance data may be recorded from a first flight segment (e.g., a first climb segment, see block 710a), a second flight segment (e.g., second climb segment, see block 710b), and up to any number of flight segments (e.g., nth climb segment, see block 710c). Essentially, performance data may be recorded during any number of flight segments completed by the aircraft 100 during the aircraft's life in service. As shown in block 720, the recorded performance data 560 may be stored onboard the aircraft, e.g., in any of the data storage devices 230 which are part of or communicatively coupled to the flight guidance system 300. In some examples, the recorded performance data 560 may alternatively or in addition be transmitted to a remote location (e.g., a server or other computing system which is part of any on-ground systems 20 as described herein), as shown in block 722. For example, the recorded performance data may be transmitted to the operator's computer 32 and/or to ATC computer(s) 42.

As further shown in block 730, a regression model 570 may be generated using the recorded performance data 560. As previously noted, the regression model 570 may be a linear or a non-linear relationship between one or more input variables and one or more output variables. The regression model 570 may be generated onboard the aircraft 100 or it may be uploaded to the aircraft 100, as shown in blocks 740 and 742, respectively. The regression model 570 may be subsequently updated over time as additional flight segments are completed by the aircraft 100. In other words, the regression model 570 may be generated using a first plurality of completed flight segments and updated using a second plurality of completed flight segments occurring after the first plurality of flight segments, the first and second plurality of segments flown by the same aircraft.

After the regression model has been loaded into the regression analysis module, and if additional recorded performance data from completed flight segments is available, the regression model 570 may be updated, as shown in block 744. An update to the regression model may be triggered by a completion of a flight segment or it may be triggered by an input command to the flight guidance system, such as an input command from the flight crew. As shown in blocks 750 and 752 respectively, estimated flight profile data for a current flight segment is generated using the regression model 570, and predicted performance data is generated based on pre-programmed performance data (e.g., from the performance database of the FMS). For example, using the regression model, a rate of climb (R/C), may be computed based on an input parameter, such as the fuel flow to engines, and a vertical trajectory may be estimated based on the regression-based rate of climb. In addition, a vertical trajectory may also be predicted using flight profile data associated with the pre-programmed performance database. The estimated and predicted flight trajectories may be compared to determine a difference between the two. If the difference exceeds a predetermined or threshold amount (see block 754), flight guidance may be provided based on the data associated with the regression model, as shown in block 760. If the difference does not exceed the predetermined threshold amount, flight guidance may be provided based on the data associated with the performance database, as shown in block 762. Further optional steps may include displaying flight guidance information in the flight deck, as shown in block 770, and driving control surfaces (e.g., via the autopilot, see block 780) in accordance with the appropriate flight guidance information as determined above at block 754.

The predetermined or threshold amount may be defined as a statistically significant deviation between the estimated and predicted parameters. In some examples, the predetermined amount may be based on a standard deviation. For example if a predicted flight profile data (e.g., a predicted flight trajectory) falls outside of one standard deviation or two standard deviations, then the predicted flight profile data may be deemed to be "statistically significant" and the estimated flight profile data would be used instead. In some examples, the predetermined or threshold amount may be governed by airline policy. In other words, the operator (e.g., airline) may set a threshold amount below which the difference is considered trivial and the functionality and calculations performed by modules of the flight guidance system may rely on the pre-programmed performance database. In some examples, the difference may be within the range of 10-15%. In further examples, the predetermined difference may be within the range of 5-20%. The predetermined difference or threshold need not have a fixed value and may be modifiable by the operator (e.g., by an input from a member of the maintenance crew).

Figure 7:
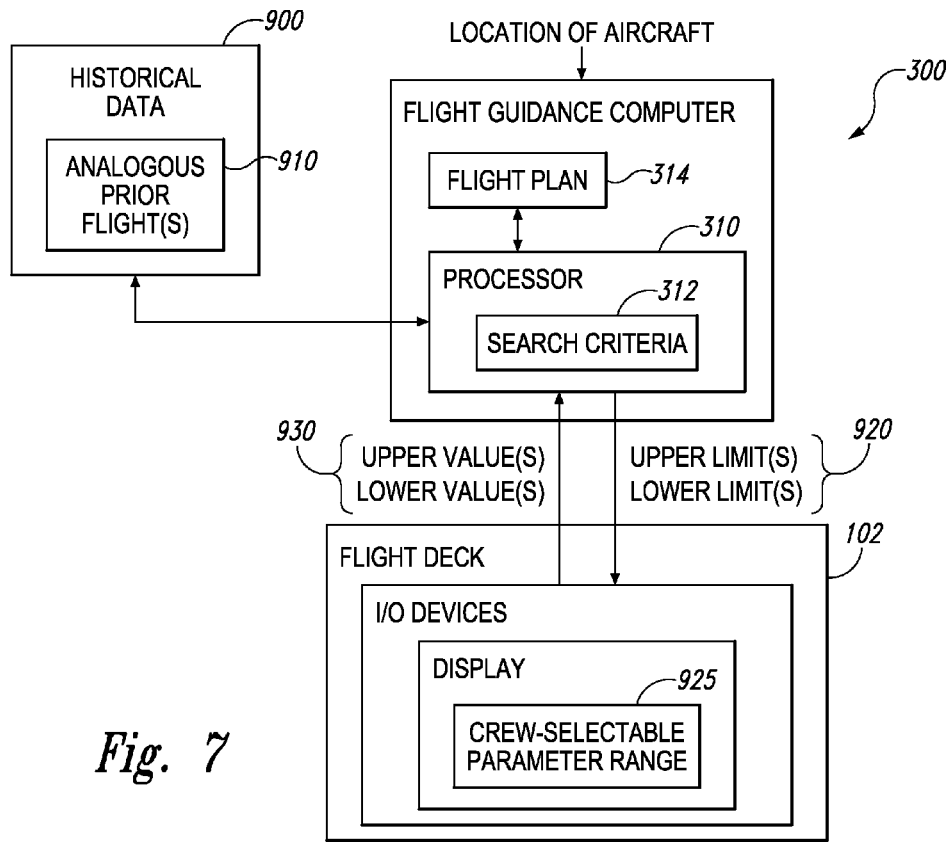
FIG. 7 shows a block diagram of a guidance system according to further examples of the present disclosure.

As will be appreciated, additional functionality for flight guidance systems 300 may be enabled through access to recorded performance data 560 from prior flights (also referred to herein as historical data 900). FIG. 7 illustrates further examples of methods for providing guidance to flight crew based on such historical data, which will be described in further detail in the context of an example scenario. As previously described, a flight plan is typically entered by the flight crew or uploaded to the FMS from a ground system (e.g., the operator's ground computer). In addition, and prior to take-off, the flight crew enters certain crew-selectable parameters, which may vary from flight to flight and which may be used by the FMS prior to and during flight to conduct performance calculations and/or other functions of the FMS. Such crew-selectable parameters may include gross weight (GW), zero fuel weight (ZFW), fuel amount (FUEL), center of gravity (CG), and others. Conventional flight management systems may impose upper and lower limits on the values that the crew can enter into the FMC for one or more of these crew-selectable parameters. Typically, the upper and lower limits are static values (e.g., these values are not updated during the service life of the aircraft) and as such limit ranges are typically very large in order to capture any possible flight scenario. As such, the ranges often are not realistic and may not be helpful to the crew in determining what upper and lower limits should be entered for a given crew-selectable parameter in the FMS.

Historical data 900 obtained from flights of a particular aircraft may provide more accurate guidance for that aircraft. According to one example scenario and with reference to FIGS. 2 and 7, the processor 310 of guidance system 300 may include computer executable instructions for performing the following additional functionality. The processor 310 may be programmed to cause a plurality of first input signals to be generated, the plurality of first input signals corresponding to a current flight plan for a current flight, query the recorded performance data (e.g., historical data 900) to identify one or more prior flights which are determined to be relevant to the current flight based on a current location of the aircraft and the current flight plan, compute upper and/or lower limits for one or more crew-selectable parameters based on the identified one or more prior flights, and display the upper and/or lower limits in a flight deck of the aircraft. In an example scenario, a member of the flight crew may enter a flight plan 314 or a flight plan 314 may be uploaded via a wireless communication (e.g., via datalink 210) to the flight guidance system 300 of the aircraft. In some examples, the flight guidance system may be integrated with components of a conventional FMS, as described above with reference to FIG. 3.

The processor 310 may be configured to cause an upper limit and/or a lower limit 920 for one or more crew-selectable parameters based on historical data 900 to be displayed. To determine upper and lower limits based on the historical data, the processor 310 may query the historical data 900 (e.g., recorded performance data 560 as shown in FIG. 4) based on certain search criteria 312, for example current location of the aircraft, time of departure (e.g., morning, afternoon, evening, or specific time of day), and entered flight plan, in order to identify any instances of prior completed flights that match one or more of the search criteria. Such matching prior completed flights may interchangeably be referred to herein as "analogous prior flights" 910. The processor 310 may generate signals corresponding to upper and lower limits 920 for one or more of the crew-selectable parameters based on the identified instances of analogous prior fights 910. For example, the processor 310 may compute an average of the lower limits and an average of the upper limits, and display upper and lower limits for the current flight utilizing statistical sigma below and above the computed averages. The processor may cause the computed upper and lower limits to be displayed on a display in the flight deck 102. For example, the upper and lower limits may be displayed as advisory messages on a CDU 530 in the form of an allowable range 925 for the crew-selectable parameter. A crew member may enter upper and/or lower values 930 for one or more of the crew-selectable parameters, e.g., via an Input/Output device 330 in the flight deck, and the processor 310 may cause the upper and/or lower values to be limited to values within respective ones of the computed upper and/or lower limits 920 for the one or more crew-selectable parameters.

According to further examples, historical data may include environmental data which may be recorded and stored onboard the aircraft and may be used to provide improved flight guidance. For example, a particular aircraft (e.g., aircraft 100) may fly a given route between a first location (e.g., origin A) and a second location (e.g., destination B) regularly (e.g., once a day, once a week, etc.) and environmental data may be recorded during each of the flights between the two locations (e.g., between A and B). If a certain level of headwind (e.g., 50 knots) when travelling from A to B and/or a certain level of tailwind (e.g., 30 knots) when travelling from B to A is recorded, the headwind and/or tailwind, which may be stored as environmental data may be used to enhance flight profile estimates for future flights, e.g., by applying the same level of headwind and/or tailwind when estimating the flight profile data, in the absence of headwind and/or tailwind input by the flight crew. In some examples, weather information may be automatically uploaded to the FMS during preflight or it may be manually input by the flight crew. In this manner, the recorded environmental data may be used to estimate flight profile data in the event that such weather information is not provided to the FMS by the flight crew and/or via an uplink.

Figure 8:
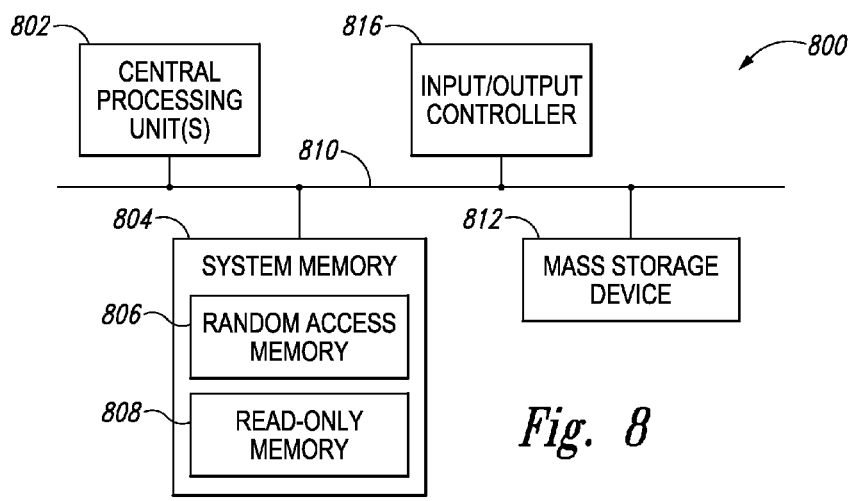
FIG. 8 shows a computer in which a guidance and control system using a regression model may be implemented according to the examples herein.

FIG. 8 illustrates a computer in which a guidance and control system using regression model may be implemented according to at least one embodiment disclosed herein. The computer 800 illustrated in FIG. 8 includes one or more central processing unit(s) ("CPUs") 802, a system memory 804, including a random-access memory ("RAM") 806 and a read-only memory ("ROM") 808, and a system bus 810 that couples the system memory 804 to the CPU 802. A basic input/output system containing the routines that help to transfer information between elements within the computer 800, such as during startup, may be stored in the ROM 808.

The CPUs 802 may be standard programmable processors that perform arithmetic and logical operations for the operation of the computer 800, such as the routine 600 described above. The CPUs 802 may perform the operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The computer 800 may also include a mass storage device 812. The mass storage device may be an optical disk, a magnetic storage device, or a solid state storage device. The mass storage device 812 may be operative to store one or more instructions to control an aircraft 100 having a flight guidance and control system 200 according to the examples herein. In another configuration, the RAM 806, ROM 808, and the mass storage device 812 may be operative to have stored thereon, either alone or in various combinations, instructions for controlling an aircraft 100 having a flight guidance and control system 200 according to the examples herein.

The computer 800 may store programs and data on the mass storage device 812 by transforming the physical state of the mass storage device 812 to reflect the information being stored. The specific transformation of physical state may depend on various factors, in different implementations of this disclosure. Examples of such factors may include, but are not limited to, the technology used to implement the mass storage device 812, whether the mass storage device 812 is characterized as primary or secondary storage, and the like.

For example, the computer 800 may store information to the mass storage device 812 by issuing instructions through a storage controller to alter the magnetic characteristics of a particular location within a magnetic disk drive device, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description, with the foregoing examples provided only to facilitate this description. The computer 800 may further read information from the mass storage device 812 by detecting the physical states or characteristics of one or more particular locations within the mass storage device 812.

The RAM 806, the ROM 808, or the mass storage device 812 may be operative as computer-readable storage mediums. Various aspects of the present disclosure may be stored on other types of computer-readable storage mediums, such as, but not limit to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 800. It should be understood that when the claims are interpreted in light of this present disclosure, a computer-readable storage medium does not include energy in the form of waves or signals.

The computer 800 also may include an input/output controller 816 for receiving and processing input from a number of other devices, including a keyboard, mouse, or electronic stylus. Similarly, the input/output controller 816 may provide an output to a display screen, a printer, or other type of output device. One or more embodiments may include a computer-readable storage medium manufactured so that, when read by a properly configured computing device, instructions may be provided to perform operations relating to controlling the flight vehicle using an autopilot having a state estimator.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A computer-implemented method for providing improved flight guidance via a flight guidance system, which includes a processor and a data storage device, the method comprising:
    recording, to the data storage device, performance data from a plurality of completed flight segments of an aircraft;
    updating a regression model based on the recorded performance data;
    estimating flight profile data for a current flight segment of the aircraft using the updated regression model;
    comparing the estimated flight profile data with predicted flight profile data for the current flight segment, the predicted flight profile data for the current flight segment based on pre-programmed performance data stored onboard the aircraft prior to the plurality of completed flight segments;
    generating flight guidance for the current flight segment based on the estimated flight profile data if the estimated flight profile data deviates from the predicted flight profile data by a predetermined amount;
    communicating the flight guidance to one or more of a flight control system, an autopilot system, an auto-throttle system, and any combinations thereof; and
    positioning control surfaces of the aircraft, based on the flight guidance, using control actuators.

2. The method of claim 1, wherein the regression model comprises a linear regression relationship between a first parameter and a second parameter, said estimating flight profile data for the current flight segment comprising determining a value of the first parameter based on a value of the second parameter.

3. The method of claim 2, wherein the current flight segment is a climb segment, wherein the first parameter is rate of climb, and wherein the second parameter is fuel flow to engines.

4. The method of claim 1, further comprising:
    generating the regression model from recorded performance data from a first plurality of completed flight segments; and
    wherein said updating the regression model based on the recorded performance data comprises updating the regression model based on recorded performance data form a second plurality of completed flight segments.

5. The method of claim 1, further comprising storing the performance data from the plurality of completed flight segments in an onboard data storage device onboard the aircraft.

6. The method of claim 5, further comprising:
storing environmental data in the onboard data storage device, the stored environmental data associated with respective performance data from the plurality of completed flight segments, the stored environmental data including at least one of temperature, pressure, vertical and horizontal winds, and atmospheric moisture; and
wherein the estimated flight profile data is further based on the stored environmental data.

7. The method of claim 1, further comprising displaying flight guidance information on at least one of a primary flight display unit, multi-function display unit, or a control display unit of the aircraft.

8. The method of claim 7, wherein the flight guidance information comprises an estimated flight trajectory based on the regression model, the method further comprising:
generating a predicted flight trajectory based on the pre-programmed performance data; and
displaying at least one of the estimated flight trajectory, the predicted flight trajectory, and an overlay of the estimated flight trajectory and the predicted flight trajectory in a flight deck of the aircraft.

9. The method of claim 8, further comprising receiving an input signal corresponding to a selection of one of the estimated flight trajectory or the predicted flight trajectory.

10. The method of claim 1, further comprising:
transmitting signals corresponding to the flight guidance to a flight control computer of the flight control system or an autopilot computer of the autopilot system of the aircraft; and
generating control surface commands for moving the control actuators in accordance with the flight guidance.

11. A guidance and control system for an aircraft, comprising:
a flight guidance system operative to generate flight guidance information, the flight guidance system including a data storage device and a processor, the processor programmed to:
cause performance data from a plurality of completed flight segments of the aircraft to be recorded to the data storage device;
update a regression model based on the recorded performance data from the plurality of completed flight segments;
estimate flight profile data for a current flight segment using the updated regression model;
compare the estimated flight profile data to predicted flight profile data for the current flight segment, the predicted flight profile data for the current flight segment based on pre-programmed performance data stored onboard the aircraft prior to the plurality of completed flight segments;
generate the flight guidance information based on the estimated flight profile data if a deviation between the estimated flight profile data and the predicted flight profile data exceeds a predetermined amount; and
a flight control system in operative communication with the flight guidance system and configured to receive the flight guidance information and position control surfaces of the aircraft, based on the flight guidance information, via control actuators.

12. The guidance and control system of claim 11, wherein the processor is further programmed to generate the regression model from recorded performance data from a first plurality of completed flight segments and update the regression model based on recorded performance data from a second plurality of completed flight segments.

13. The guidance and control system of claim 11, wherein:
the current flight segment comprises a climb segment;
the plurality of completed flight segments comprise a plurality of prior climb segments flown by the aircraft prior to the current climb segment; and
the flight guidance information includes an estimated climb trajectory for the current climb segment, the climb trajectory based on a rate of climb derived from a linear regression relationship between fuel flow to engines and rate of climb values recorded from the plurality of prior climb segments.

14. The guidance and control system of claim 11, further comprising:
an onboard data storage device onboard the aircraft; and
wherein the processor is further programmed to cause the recorded performance data from the plurality of completed flight segments to be stored in the onboard data storage device.

15. The guidance and control system of claim 11, further comprising:
a display unit in a flight deck of the aircraft, the display unit selected from a control display unit, a navigation display unit, and a multi-function display unit; and
wherein the processor is further programmed to cause the flight guidance information based on the estimated flight profile data to be displayed on the display unit.

16. The guidance and control system of claim 15, wherein the processor is further programmed to cause the flight guidance information based on the estimated flight profile data to be displayed over flight guidance information generated based on the pre-programmed performance data.

17. The guidance and control system of claim 11, wherein the flight control system is further configured to generate control surface commands for moving the control surfaces of the aircraft; and
wherein the processor is further programmed to cause signals corresponding to the flight guidance information based on the estimated flight profile data to be transmitted to the flight control system for generating control surface commands in accordance with the flight guidance information.

18. The guidance and control system of claim 11, wherein the processor is further programmed to:
cause a plurality of first input signals to be generated, the plurality of first input signals corresponding to a current flight plan for a current flight;
query the recorded performance data to identify one or more prior flights which are determined to be relevant to the current flight based on a current location of the aircraft and the current flight plan;
compute at least one of upper and lower limits for one or more crew-selectable parameters based on the identified one or more prior flights; and
display said at least one of the upper and lower limits in a flight deck of the aircraft.

19. The guidance and control system of claim 18, wherein the one or more crew-selectable parameters comprises gross weight, zero fuel weight, fuel amount, center of gravity, or combinations thereof.

20. The guidance and control system of claim 18, wherein the processor is further configured to:

cause one or more second input signals to be generated, the one or more second input signals corresponding to at least one of an upper and lower value for the one or more crew-selectable parameters, wherein said at least one of the upper and lower value is limited to values within the computed upper and lower limits for the one or more crew-selectable parameters.

21. A non-transitory computer readable medium including instructions which, when executed on a processor of a flight guidance system, perform a method comprising:
   causing performance data from a plurality of completed flight segments of an aircraft to be recorded to a data storage device;
   updating a regression model based on the recorded performance data;
   estimating flight profile data for a current flight segment of the aircraft using the regression model;
   comparing the estimated flight profile data with predicted flight profile data for the current flight segment, the predicted flight profile data for the current flight segment based on performance data stored on the aircraft prior to the plurality of completed flight segments;
   generating flight guidance information for the current flight segment based on the estimated flight profile data if the estimated flight profile data deviates from the predicted flight profile data by a predetermined amount;
   communicating the flight guidance to one or more of a flight control system, an autopilot system, an auto-throttle system, and any combinations thereof; and
   positioning control surfaces of the aircraft, based on the flight guidance, using control actuators.

22. The non-transitory computer readable medium of claim 21, wherein the flight guidance information comprises an estimated flight trajectory based on the regression model, the non-transitory computer readable medium including further instructions for:
   generating a predicted flight trajectory based on the pre-programmed performance data; and
   displaying at least one of the estimated flight trajectory, the predicted flight trajectory, and an overlay of the estimated flight trajectory and the predicted flight trajectory in a flight deck of the aircraft.

* * * * *